United States Patent
Caulkins

(10) Patent No.: US 8,225,022 B2
(45) Date of Patent: Jul. 17, 2012

(54) METHODS FOR ELIMINATING INTERMEDIATE BUSSING AND BRIDGING REQUIREMENTS BETWEEN A SOLID STATE MEMORY DEVICE WITH PCI CONTROLLER AND A MAIN SYSTEM BUS

(75) Inventor: Jason Caulkins, Redding, CA (US)

(73) Assignee: Dataram, Inc., West Windsor, NJ (US)

( * ) Notice: Subject to any disclaimer, the term of this patent is extended or adjusted under 35 U.S.C. 154(b) by 284 days.

(21) Appl. No.: 11/835,395

(22) Filed: Aug. 7, 2007

(65) Prior Publication Data

US 2008/0040520 A1 Feb. 14, 2008

Related U.S. Application Data

(60) Provisional application No. 60/836,556, filed on Aug. 8, 2006.

(51) Int. Cl.
| | | |
|---|---|---|
| G06F 13/14 | (2006.01) | |
| G06F 13/12 | (2006.01) | |
| G06F 13/38 | (2006.01) | |
| G06F 13/20 | (2006.01) | |
| G06F 12/00 | (2006.01) | |
| G06F 13/00 | (2006.01) | |
| G06F 13/28 | (2006.01) | |
| H05K 7/10 | (2006.01) | |

(52) U.S. Cl. .......... 710/305; 710/74; 710/301; 710/313; 711/103; 711/115

(58) Field of Classification Search .................... 710/74, 710/301, 305, 313; 711/103, 115, 130
See application file for complete search history.

(56) References Cited

U.S. PATENT DOCUMENTS

| | | | |
|---|---|---|---|
| 6,874,044 B1 * | 3/2005 | Chou et al. ................... 710/62 |
| 7,111,085 B2 | 9/2006 | Estakhri | |
| 7,356,637 B2 | 4/2008 | Tee | |
| 7,457,897 B1 * | 11/2008 | Lee et al. ..................... 710/74 |
| 2005/0050245 A1 * | 3/2005 | Miller et al. ................. 710/36 |
| 2005/0120146 A1 * | 6/2005 | Chen et al. ................... 710/22 |
| 2005/0240713 A1 * | 10/2005 | Wu et al. ..................... 710/314 |
| 2005/0262297 A1 * | 11/2005 | Arakawa et al. ............. 711/112 |
| 2006/0168391 A1 | 7/2006 | Gan | |
| 2006/0271727 A1 * | 11/2006 | Wang et al. .................. 711/103 |
| 2007/0294467 A1 * | 12/2007 | Leung .......................... 711/103 |
| 2008/0215808 A1 * | 9/2008 | Ashmore et al. ............. 711/113 |
| 2009/0049222 A1 * | 2/2009 | Lee et al. ..................... 710/300 |

OTHER PUBLICATIONS

Flash Memory PCI Add-in Card for Embedded Systems, Sep. 1997.

\* cited by examiner

*Primary Examiner* — Chun-Kuan Lee
*Assistant Examiner* — Farley Abad
(74) *Attorney, Agent, or Firm* — Donald R. Boys; Central Coast Patent Agency, Inc.

(57) ABSTRACT

A method is provided for enabling electronic representation of a removable or fixed data storage device having a non-volatile memory as an operating system-standard disk directly accessible to a main bus of a computing appliance having a peripheral component interface connector and a motherboard. The method includes the acts (a) providing a peripheral component interface ported to a memory controller on the device, the memory controller for controlling host access to the non-volatile memory, (b) providing disk control registers and or bus control registers including appropriate disk and or bus protocols and commands in the peripheral component interface on the device, and (c) connecting the device to the peripheral component interface connector of the computing appliance.

9 Claims, 10 Drawing Sheets

METHODS FOR ELIMINATING INTERMEDIATE BUSSING AND BRIDGING REQUIREMENTS BETWEEN A SOLID STATE MEMORY DEVICE WITH PCI CONTROLLER AND A MAIN SYSTEM BUS

CROSS-REFERENCE TO RELATED APPLICATIONS

The present invention claims priority to a U.S. provisional patent application Ser. No. 60/836,556 entitled SOLID STATE MEMORY DEVICE WITH PCI CONTROLLER filed on Aug. 8, 2006, disclosure of which is incorporated herein at least by reference.

BACKGROUND OF THE INVENTION

1. Field of the Invention

The present invention is in the field of computer hosted memory cards and associated hard disk interfaces and pertains particularly to methods and apparatus for eliminating intermediate data bussing and bridging requirements between a removable data storage element like a memory device or a computer hard disk.

2. Discussion of the State of the Art

In the field of computer components including removable memory devices, there has been much advancement in the technology and improvements continue. In a typical computer system, a system bus or host bus is the main data bus used to communicate between components. With the advent of removable memory devices and peripheral devices other types of computer busses were developed to enable smooth data transmission without interrupting CPU processing. Most computer systems today include a series of computer busses that branch off of the main bus or system bus. These busses include a peripheral component interconnect (PCI) bus and universal serial bus (USB), both well known in the art in several different variations.

Most modern computing systems include a disk drive that has a built in disk controller. The most common implementation is advanced technology attachment (ATA), which includes a protocol known as programmed input/output (PIO) for data transfer. Most modern ATA systems use direct memory access (DMA) protocol for data transfer.

In prior art, removable memory devices like secure digital or universal serial bus solid-state memory devices are attached to an intermediate disk channel, then to a disk controller, then to a PCI channel connected to the host bus before the operating system can recognize and interact with the device. From a standards point of view the current method of interfacing to a removable solid-state memory device is acceptable and works well. However, from a system performance point of view, there is a performance loss any time an intermediate channel or bus is imposed between a data storage element like a removable solid-state memory device and a host computer main system bus.

FIG. 1 is a block diagram of a removable secure digital (SD) card 100 adapted for use with a personal computer (PC) according to prior art. SD card 101 is typically used in video recording and playback devices, mobile phones, digital cameras, and other hand-held devices. More recently, computers have been provided with SD card slots on their exterior surface housings for accepting SD cards. In this example, SD card 100 plugs into a host computer 101. SD card 100 has a flash memory (MEM) module 102, a flash controller 104 for controlling how the host uses flash MEM 102, and a disk interface 105 for providing interface capability to the hard disk drive of the host computer 101.

Host computer 101 has a PC board 111, typically a motherboard that has a peripheral component interconnect (PCI) interface 109 as is typical with most computer hosts. The PCI interface communicates to the motherboard via a PCI channel 110, and through disk control registers 108 to a disk controller 107. Disk controller 107 must communicate to flash controller 104 through disk interface 105 on SD card 100 via disk channel 106.

All of these components must be present so that the host operating system immediately recognizes flash MEM 102 as a system disk without requiring installation and/or pre-activation of special software drivers or other software that registers the device with the host registry system on the computer and enables the device for normal use. The requirement of so many interfacing components between the peripheral storage element and the system may contribute to some limitation in performance, more particularly, the speed at which flash memory 102 may be read and written to.

FIG. 2 is a block diagram of a removable jump drive or "flash drive" 200 adapted for use with a host computer according to prior art. Jump drive 200, also known in the art as a "thumb" drive or "key chain" drive is a universal serial bus (USB) device that may be plugged into a to a USB port on host computer 201. Jump drive 200 has a flash MEM 202 for persistent data storage. Jump drive 200 also has a flash controller 204 that controls how data is stored and accessed. Controller 204 communicates on one side to flash MEM 202 via an address/data control channel 203 and on the other side to a universal serial bus (USB) interface 205.

Host computer 201 communicates with jump drive 200 through a USB channel 206. Host computer 201 has a USB controller 207 and bus control registers 208 between USB interface 205 on drive 200 and a PCI interface 209. Host computer 201 has a PC board, typically a motherboard that communicates to the USB port through PCI interface 209 via a PCI channel 210. In this example, The USB components must be in place between the PCI interface on host computer 201 and the flash controller 204 in order for flash MEM 202 to be recognized by the host computer without requiring software driver installation and pre-configuration or pre-activation tasks similar to those tasks required with the SD card described further above with respect to FIG. 1.

What is clearly needed in the art is unified controller that connects a removable or non-removable solid-state memory device directly to a host system bus without requiring any intermediary bus or channel between the device and the main system bus. Such a controller could be provided as part of the removable or non-removable media reducing overall complexity of the interfacing requirements, improving performance of read and write on the device, and enabling overall reduction of physical space required implementing the interface.

SUMMARY OF THE INVENTION

A method is provided for enabling electronic representation of a removable or fixed data storage device having a non-volatile memory as an operating system-standard disk directly accessible to a main bus of a computing appliance having a peripheral component interface connector and a motherboard. The method includes the acts (a) providing a peripheral component interface ported to a memory controller on the device, the memory controller for controlling host access to the non-volatile memory, (b) providing disk control registers and or bus control registers including appropriate disk and or bus protocols and commands in the peripheral component interface on the device, and (c) connecting the device to the peripheral component interface connector of the computing appliance.

In one aspect, the non-volatile memory is one or a combination of a non-volatile random access memory, or a flash memory. In an aspect where flash is used, the flash memory is one of a parallel flash memory, a series flash memory, or a series-parallel flash memory. Also in one aspect, the non-volatile memory controller is a dedicated flash memory controller and is one of a parallel flash controller, a series flash controller, or a series parallel flash controller.

In one aspect in act (a), the peripheral component interface and the memory controller are packaged as a system interface controller installable to a card supporting the non-volatile memory. In one aspect in act (b), the disk controller registers are provided in the form of advanced technology attachment controller registers. In one aspect in act (b), the bus controller registers are provided in the form of universal serial bus controller registers.

In one aspect in act (c), the peripheral component interface connector is presented in a standard peripheral component interface slot on the computing appliance. In another aspect in act (c), the peripheral component interface connector is presented on the motherboard of the computing appliance, the device fixedly wired to the motherboard.

According to another aspect of the present invention, a method is provided for accelerating reading and writing of data from a removable or fixed data storage device having a flash memory and a system interface controller, the system interface controller including a flash memory controller and a peripheral component interface with disk and or bus controller registers. The method includes the acts: (a) providing a random access memory controller to the system interface controller and porting it to the flash memory controller, (b) providing a random access memory chip to the system interface controller and connecting the chip to the random access memory controller, (c) providing flash memory address translation tables in the random access memory and (d) using the random access memory as a data cache for read and write operations performed by a computing appliance.

In one aspect, the flash memory is one of a parallel flash memory, a series flash memory, or a series-parallel flash memory. In one aspect, the disk controller registers are advanced technology attachment registers. In one aspect, the bus controller registers are universal serial bus registers.

BRIEF DESCRIPTION OF THE DRAWING FIGURES

DETAILED DESCRIPTION

The inventor provides a persistent memory device that may be plugged into a PCI slot on a host computer and that can be recognized in a plug and play fashion without requiring an intermediate interfacing protocol between the PCI interface and the MEM controller on the persistent memory device. Persistent memory is defined for the purpose of this specification as any memory that retains data and state without requiring power. Non-volatile memory (NVMEM) such as flash memory or magnetic random access memory (MRAM) are examples solid-state persistent memory.

Figure 3:
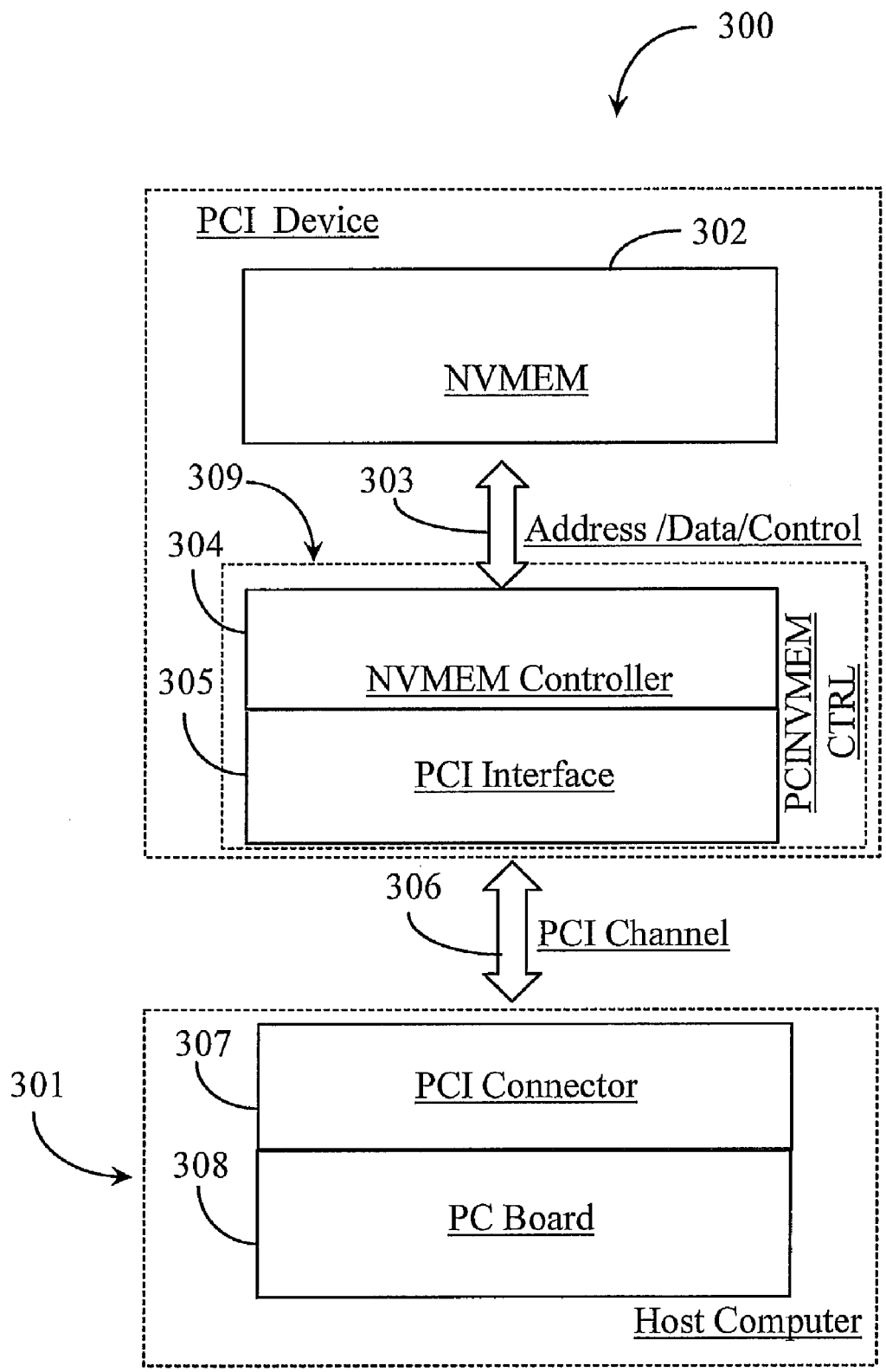
FIG. 3 is a block diagram illustrating a PCI memory device adapted to work with a host computer according to an embodiment of the present invention.

FIG. 3 is a block diagram illustrating a PCI memory device 300 adapted to work with a host computer 301 according to an embodiment of the present invention. PCI device 300 has a NVMEM 302 for storing data. NVMEM 302 may be any version of flash memory or some other version of RAM that is non-volatile such as, but not limited to, MRAM, NRAM, or FRAM. PCI device 300 has a NVMEM controller 304 provided thereto for controlling host access to NVMEM 302 via address/data control channel 303.

In this example, device 300 has a PCINVMEM controller 309 provided by the inventor that includes a PCI interface 305 integrated directly with NVEM controller 304. In this example, PCI device 300 is adapted to fit into a PCI card slot or connector on host computer 301. In one embodiment, the card may fit directly into a PCI slot. In another embodiment, a slot adapted may be used depending on card architecture. For the purpose of discussion host computer 301 may be one of a variety of host computing appliances including a laptop computer, a desktop computer, a personal digital assistant (PDA), or some other hand-held or desktop computing system.

Host computer 301 has a PCI connector 307 and a PC board 308, typically a motherboard. Host computer 301 communicates with device 300 directly over a PCI channel 306 without any intermediate bus or disk controllers. In one embodiment, device 300 may be soldered directly to PC board 308 using PCI channel 306. In another embodiment, device 300 may be modular and may be connected to host computer 301 in an available PCI slot and may then be easily removed for maintenance or other purposes.

PCINVMEM controller 309 incorporates the functions of NVMEM controller 304 and PCI interface 305 together eliminating traditional USB or hard disk interfacing components. Combining PCI interface 304 and NVMEM controller 305, the combination hosted on device 300 as new controller 309 obfuscates the requirement for an intermediary disk channel or bus channel between the storage element (device 300) and the host system bus of host computer 301. In other words, the PCI device plugs into the PCI connector allowing the central processing unit of the hosting computing appliance to read from and write to the non-volatile memory on the device without using an intermediary component to broker data translation. In this way, performance, more particularly, access speed for write and read operations, is improved. Moreover, system cost, component complexity, and physical space requirements for the device are reduced.

In this embodiment, device 300 must be installed on host system 301 and drivers must be installed before the host system can recognize and activate the device. However, the inventor provides a unique and flexible enhancement that will allow device 300 to be immediately recognized and activated by the host system as a system disk, a plug and play device, or as a USB device as soon as the device is plugged in without requiring an actual hard disk channel interface or a hard USB channel interface. More detail about this optimization is provided in the examples below.

Figure 4:
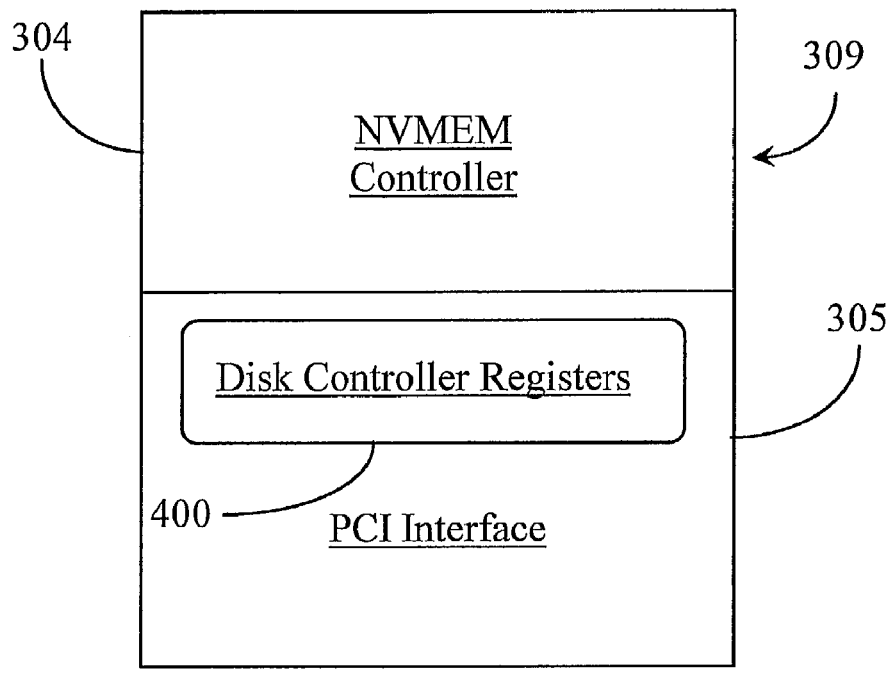
FIG. 4 is a block diagram illustrating the PCI memory device of FIG. 3 optimized with disk controller registers in the PCI interface according to an embodiment of the present invention.

FIG. 4 is a block diagram illustrating a PCINVMEM controller 309 optimized with disk controller registers 400 in the PCI interface according to an embodiment of the present invention.

Figure 5:
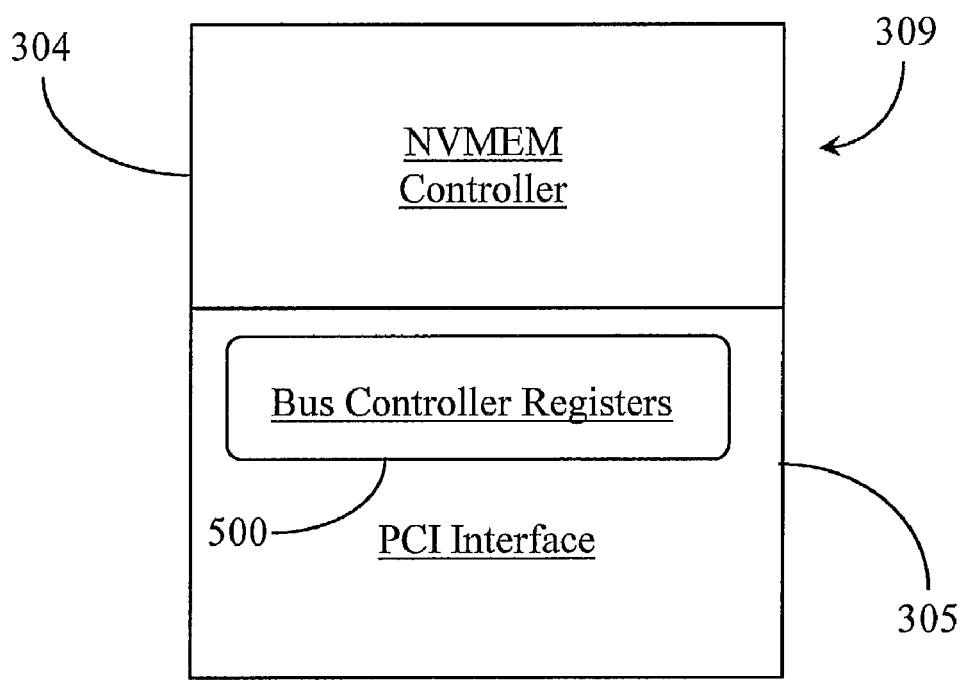
FIG. 5 is a block diagram illustrating the PCI memory device of FIG. 3 optimized with bus controller registers according to another embodiment of the present invention.

FIG. 5 is a block diagram illustrating PCINVEM controller 309 optimized with bus controller registers 500 according to another embodiment of the present invention.

Figure 1:
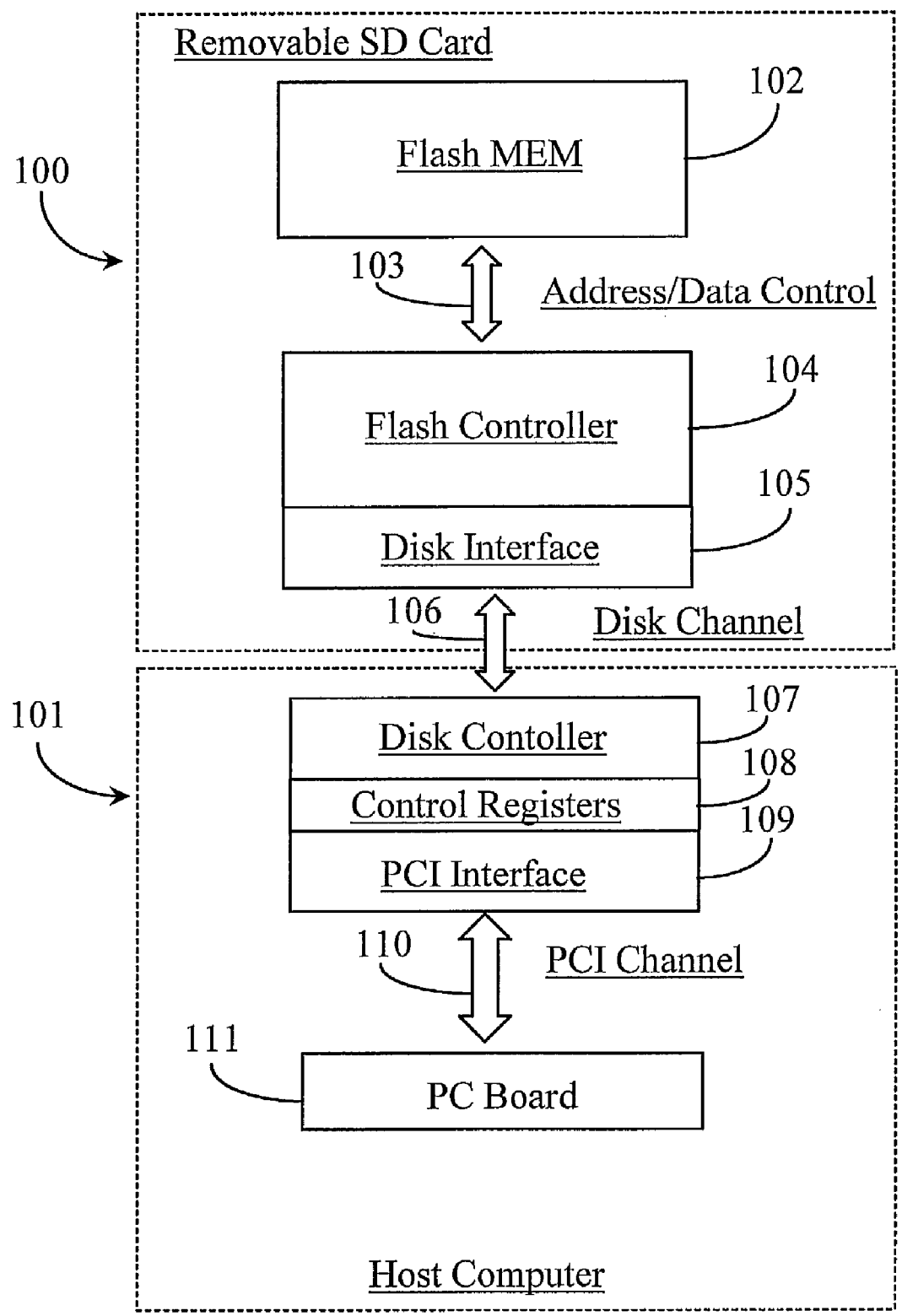
FIG. 1 is a block diagram of a removable secure digital card adapted for use with a personal computer according to prior art.
Figure 2:
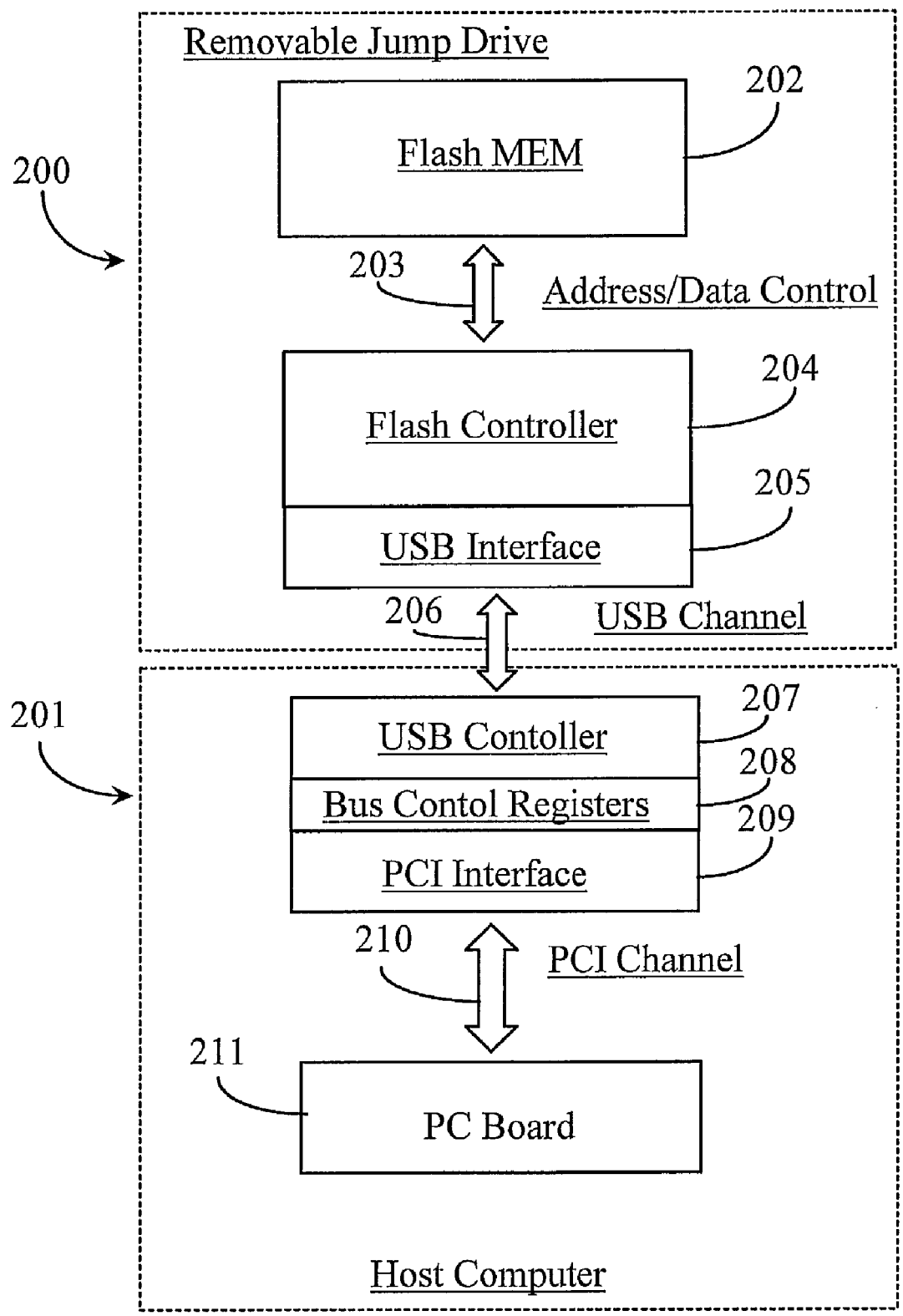
FIG. 2 is a block diagram of a removable jump drive adapted for use with a host computer according to prior art.

Referring now to FIG. 4, PCINVMEM controller 309 includes controller 304 and PCI interface 305 described further above. The controller is enhanced in this example by adding disk controller registers 400 to the PCI interface circuitry. Disk controller registers 400 are not part of a physical disk controller in this embodiment. Registers 400 contain values, including but not limited to advanced technology attachment (ATA) tables and commands that enable the host operating system querying the device to immediately recognize the associated PCI device as a disk without requiring participation of a hard disk controller interface, disk controller, or disk channel described above with respect to FIG. 1 described in the background section. In a preferred embodiment, the unified controller 309 is part of a removable PCI solid-state memory device that may be plugged into a PCI slot, or may be hardwired to a PC motherboard as an additional memory storage device that functions as an ATA device. However, in another embodiment, the unified controller of the present invention may be provided to a removable jump drive typically plugged into a USB port on the host computer as will be discussed later in this specification.

Referring now to FIG. 5, PCINVMEM controller 309 includes NVMEM controller 304 and PCI interface 305 described above with respect to FIG. 4. In this example, the controller is enhanced for immediate recognition and activation at boot or plug in by providing bus controller registers 500 to the PCI interface circuitry. Bus controller registers 500 contain values that enable the host operating system to immediately recognize the associated PCI device as a bused storage device without requiring a hard bus controller interface. Bus controller registers may be any type of peripheral bus registers including but not limited to universal serial bus registers.

In one embodiment, the inventor provides both disk controller registers and bus controller registers to the controller so that it may be recognized as either a disk device or a bussed and ready device. That is to say the card of the invention may be adapted as a dual type-recognition persistent memory storage element.

Figure 6:
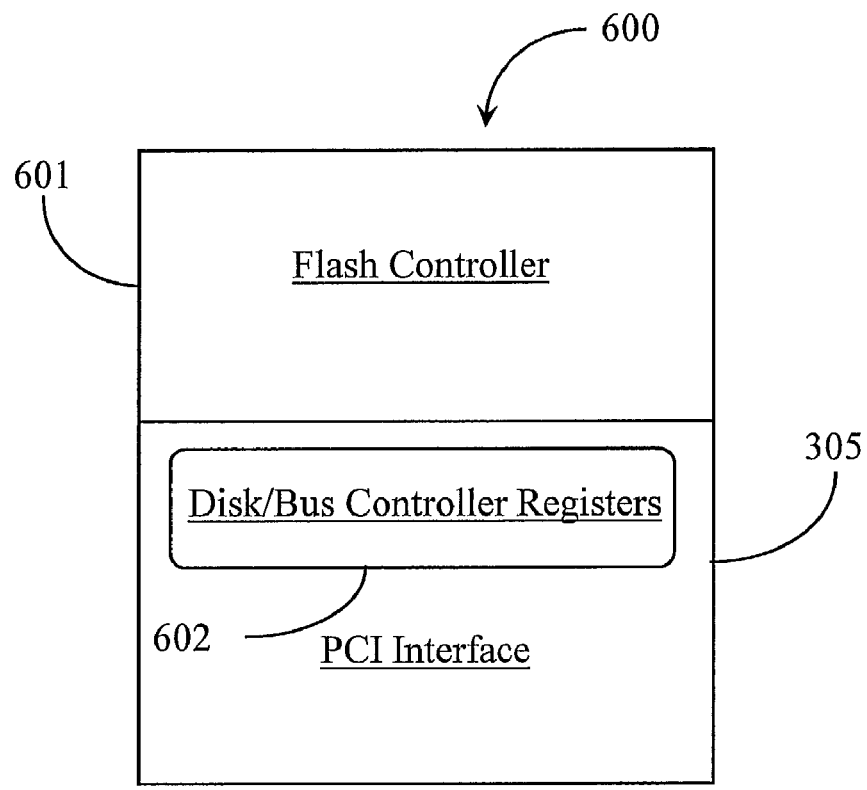
FIG. 6 is a block diagram illustrating a PCIFLASH controller according to another embodiment of the present invention.

FIG. 6 is a block diagram illustrating a PCIFLASH controller 600 according to another embodiment of the present invention. PCIFLASH controller 600 is analogous to NVMEM controller 309 optimized with disk registers or bus registers wherein the memory controller circuitry is dedicated as a "flash" memory controller 601. PCI interface 305, in this example, may be optimized with disk and/or Bus controller registers 602, which may be disk controllers or bus controllers depending on which type of device the PCI device (300) is designed to emulate to a host system. In either case, the host immediately recognizes the device when it is installed in a PCI slot or bus port. Moreover, only one channel is required for read and write operations. No intermediate branch of the system bus is interposed between the storage element and the host system bus.

Figure 7:
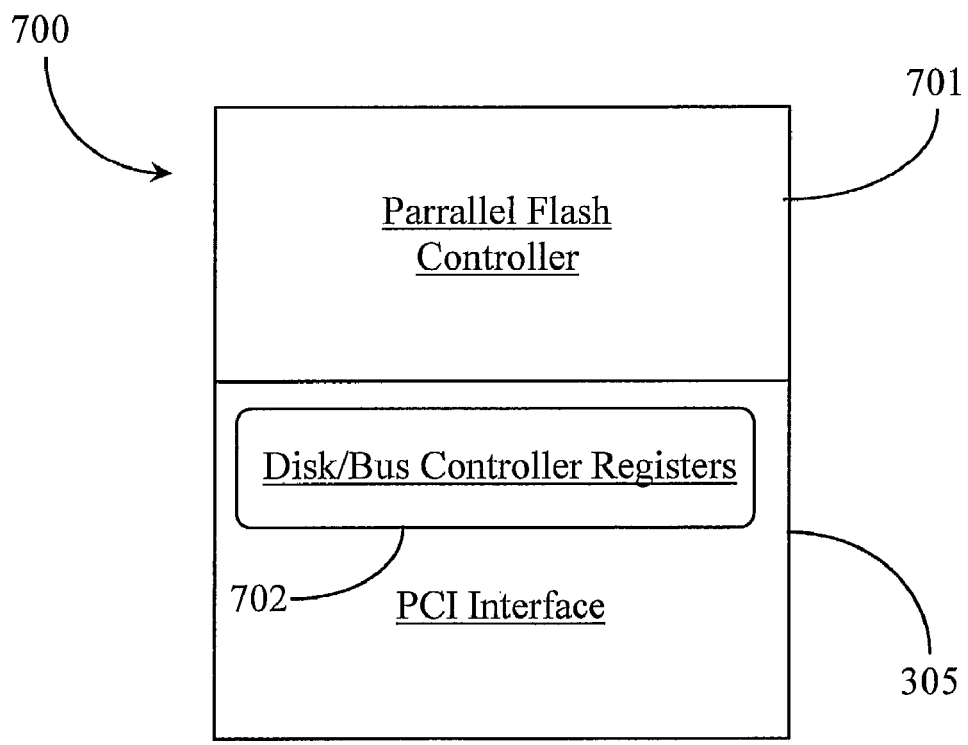
FIG. 7 is a block diagram illustrating a parallel PCIFLASH controller according to another embodiment of the present invention.

FIG. 7 is a block diagram illustrating a parallel PCIFLASH controller 700 according to another embodiment of the present invention. Parallel PCIFLASH controller 700 is analogous to NVMEM controller 309 optimized with disk registers or bus registers wherein the controller circuitry is dedicated as a parallel flash controller 701. PCI interface 305, in this example, may be optimized with controller registers 702, which may be disk controller registers or bus controller registers depending on which type of device the PCI device (300) is designed to emulate to a host system. In either case, the host immediately recognizes the device. In one embodiment, both disk controller registers and bus controller registers are present on the device and the host system will recognize the device as a disk device or bussed and ready device. In the parallel flash embodiment, multiple flash chips are present on the memory device and connected in parallel for read and write access. This should not be construed as a limitation as multiple flash chips may also be arranged in series or in a combination of series and parallel without departing from the spirit and scope of the present invention.

Figure 8:
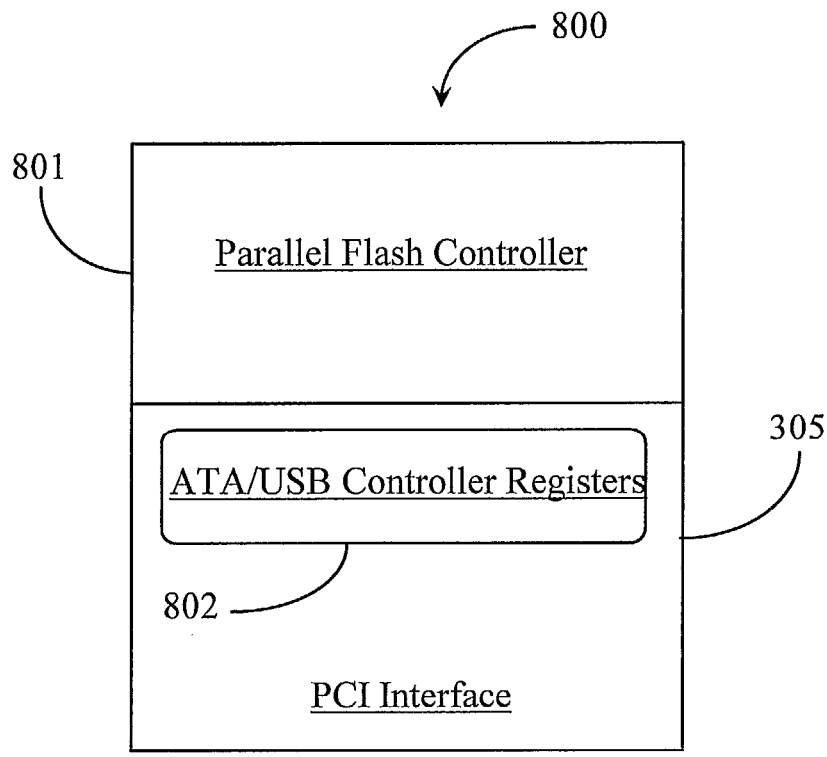
FIG. 8 is a block diagram illustrating a parallel PCIFLASH controller according to another embodiment of the present invention.

FIG. 8 is a block diagram illustrating a parallel PCIFLASH controller 800 according to another embodiment of the present invention. Parallel PCIFLASH controller 800 is analogous to parallel PCIFLASH controller 701 optimized with disk registers or bus registers wherein the controller circuitry is dedicated as a parallel flash controller 801. PCI interface 305, in this example, may also be optimized with "dedicated" controller registers 802, which may be advanced technology attachment (ATA) disk controller registers and/or USB bus controller registers depending on which type of device the PCI device (300) is designed to emulate to a host system, an ATA disk or a USB device. In either case, the host immediately recognizes the device. In one embodiment, both ATA controller registers and USB controller registers may be provided so that the memory device may be recognized as a USB device or as an ATA disk. The dedication of the flash controller as a parallel flash controller indicates that multiple flash chips are arranged in parallel on the removable device. It is important to note herein that by providing the control registers and associated protocols and commands onboard the removable storage element, the host system "sees" the device as a disk or a bussed and ready device enabling a reduction of communication channels, data translation tasks, and pre-activation requirements typical of prior-art devices described further above.

Figure 9:
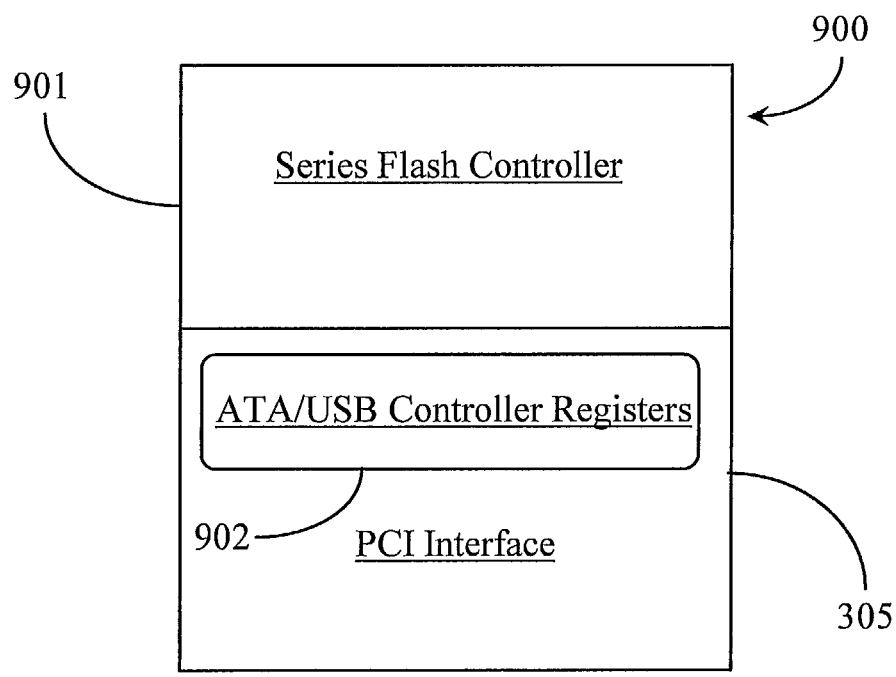
FIG. 9 is a block diagram illustrating a parallel PCIFLASH bus controller according to yet another embodiment of the present invention.

FIG. 9 is a block diagram illustrating a series PCIFLASH controller 900 according to yet another embodiment of the present invention. In this example, the flash memory comprises a plurality of flash chips connected in series, one after the other. PCI interface 305 contains ATA controller registers and/or USB controller registers 902 depending on whether the PCI device, in this case a series flash memory device, will be recognized as an ATA disk or a USB device. In either case, a hard disk controller or a hard USB controller interface is not required. In one embodiment, both ATA controller registers and USB controller registers may be provided so that the memory device may be recognized as an ATA disk or as a USB drive.

Figure 10:
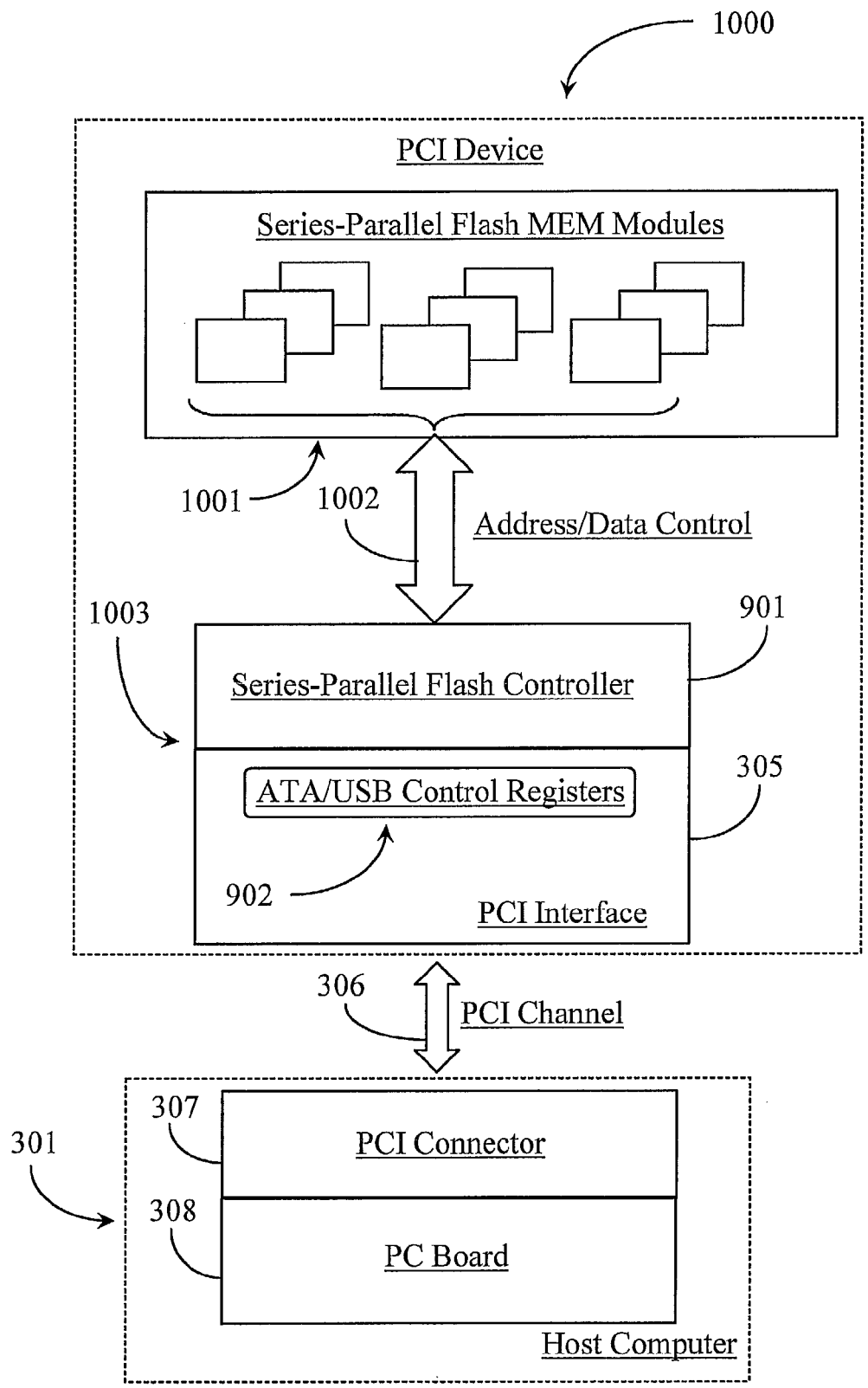
FIG. 10 is a block diagram illustrating a PCI storage device according to an embodiment of the present invention.

FIG. 10 is a block diagram illustrating a PCI storage device 1000 according to an embodiment of the present invention. PCI device 1000 has a plurality of flash memory modules 1001 that are connected in series and in parallel for communication both to improve speed and to increase memory density on the same or smaller footprint. A series-parallel PCI-FLASH controller 1003 controls access and control to flash MEM modules 1001 through address/data control channel 1002. Series-parallel PCIFLASH controller 1003 includes controller circuitry 901 and PCI interface 305 with ATA or USB control registers 902. In one embodiment, both ATA controller registers and USB controller registers may be provided so that the device may be recognized as an ATA disk or as a USB drive.

As described in previous embodiments, PCI device 1000 plugs into a PCI slot 307 attached to PC board 308, which is typically a motherboard of host computer 301. It is noted herein that ATA controller registers may include any known variation of advanced technology attachment protocols without departing from the spirit and scope of the present invention. One with skill in the art will recognize that other types of disk controller registers may also be provided in PCI interface 305 in addition to or in place of the illustrated ATA controller registers without departing from the spirit and scope of the present invention.

Figure 11:
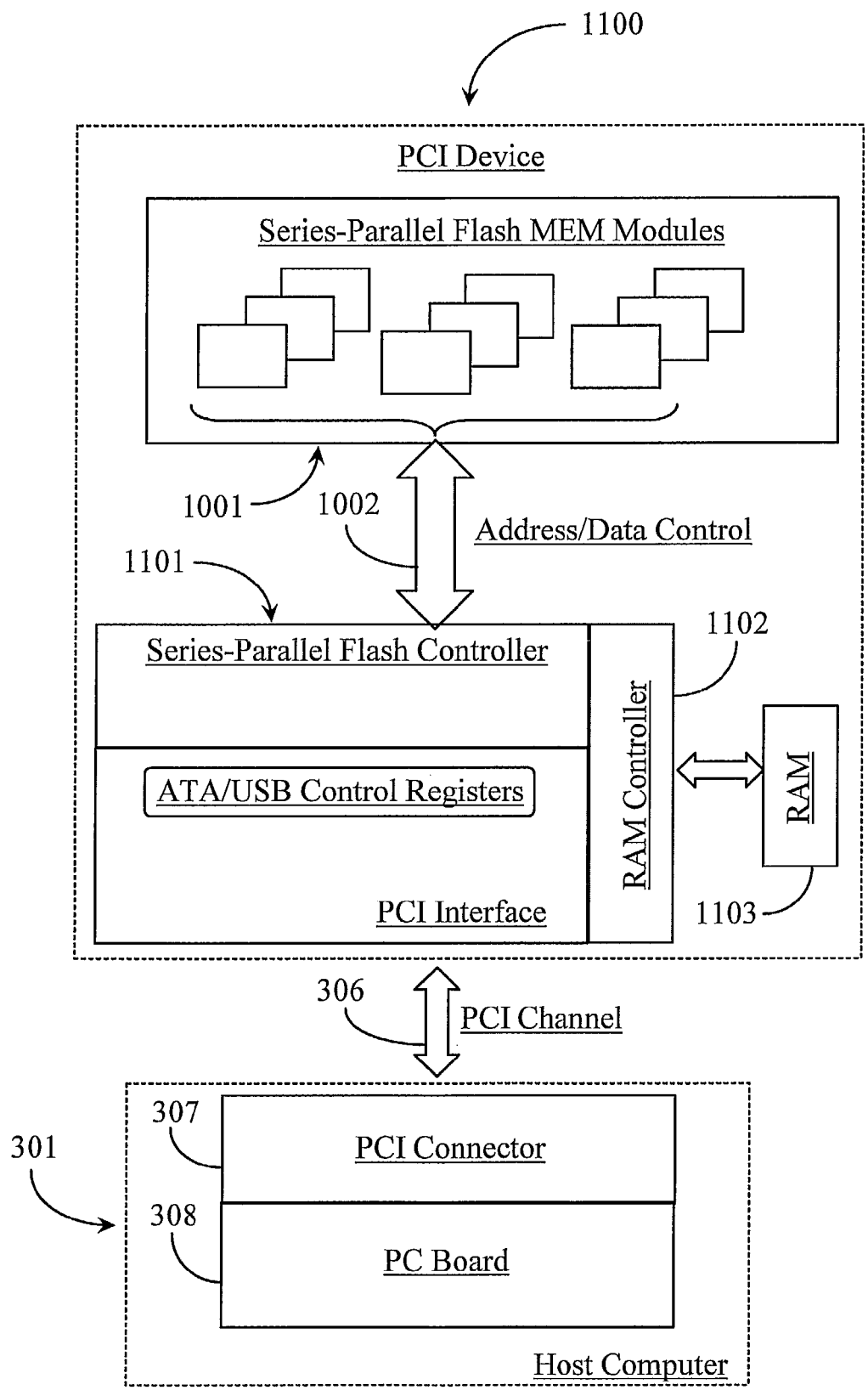
FIG. 11 is a block diagram of the storage device of FIG. 10 according to another embodiment of the present invention.

FIG. 11 is a block diagram illustrating a PCI device 1100 according to a further embodiment of the present invention. PCI device 1100 is similar to device 1000 with the exception that the inventor provides an additional controller component to the unified controller 1003 illustrated in FIG. 10.

In one embodiment of the present invention, a series-parallel PCIFLASH controller 1101 is provided onboard PCI device 1100. Controller 1101 includes a series-parallel flash controller and ATA/USB controller registers added for emulating the device as a ATA disk or USB device at boot or upon plug-in. The inventor adds a random access memory (RAM) controller 1102 to PCI device 1100, more particularly to series-parallel PCIFLASH controller 1101, and an amount of RAM 1103. In one embodiment RAM 1103 is DDR-2 type RAM. RAM controller 1102 is integrated with and is a part of series-parallel PCIFLASH controller 1101.

In this example, read and write speeds are further optimized by the provision of RAM 1103 functioning as a fast data cache and/or additional flash address management table data. In a PCI embodiment, the host system supplies the power to RAM to keep it alive during operation. Of course, if the device is removed from the host, RAM 1103 does not retain any cached data, but may write the cached data into flash and retrieve it again at the next boot opportunity. PCI protocols exist that handle sudden device removal and other types of power interruptions.

Figure 12:
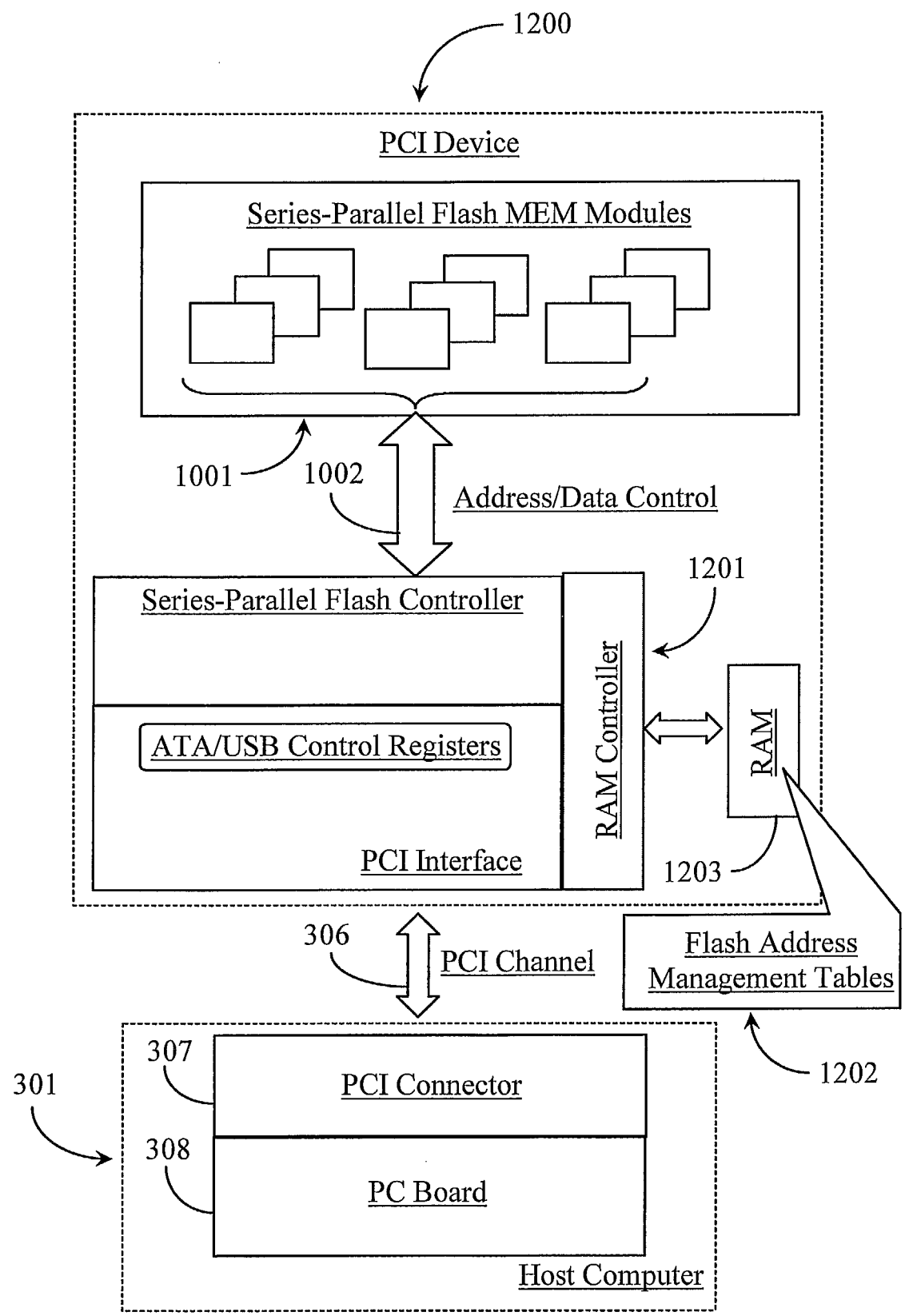
FIG. 12 is a flow chart illustrating steps for recognizing the storage device of FIG. 10 according to an embodiment of the present invention.

FIG. 12 is a block diagram illustrating a PCI device 1200 according to a further embodiment of the invention. PCI device 1200 is similar to device 1100 described above including the addition of RAM 1103 to the PCI device and an on-board RAM controller 1102 added to the controller of the invention to provide control of and access to RAM 1103 for use as a data cache and/or additional flash address management table data.

In this example, the inventor provides one or more flash address management tables 1202 to the RAM 1203 creating an enhanced controller 1201. In this way, address translation from RAM to Flash (known to the inventor) can be implemented and integrated with the fast RAM caching capability to optimize read/write performance speed relative to access of the flash memory even more. In this embodiment, when the PCI device is removed the RAM controller may write its data to the flash in controller 1203 and retrieve it when powered back on at host coupling. This technique enables more flash memory to be provided to the removable device without comprising the speed of read and write to the device memory. In one embodiment, the device may use a disengaging protocol such as an "eject and wait" routine before disengaging it from the host system in order to give time for RAM dumping into Flash on the controller. However, this is not required in order to practice the invention in this embodiment as cache may be mirrored into flash during operation; as well other backup techniques are available in the art.

Figure 13:
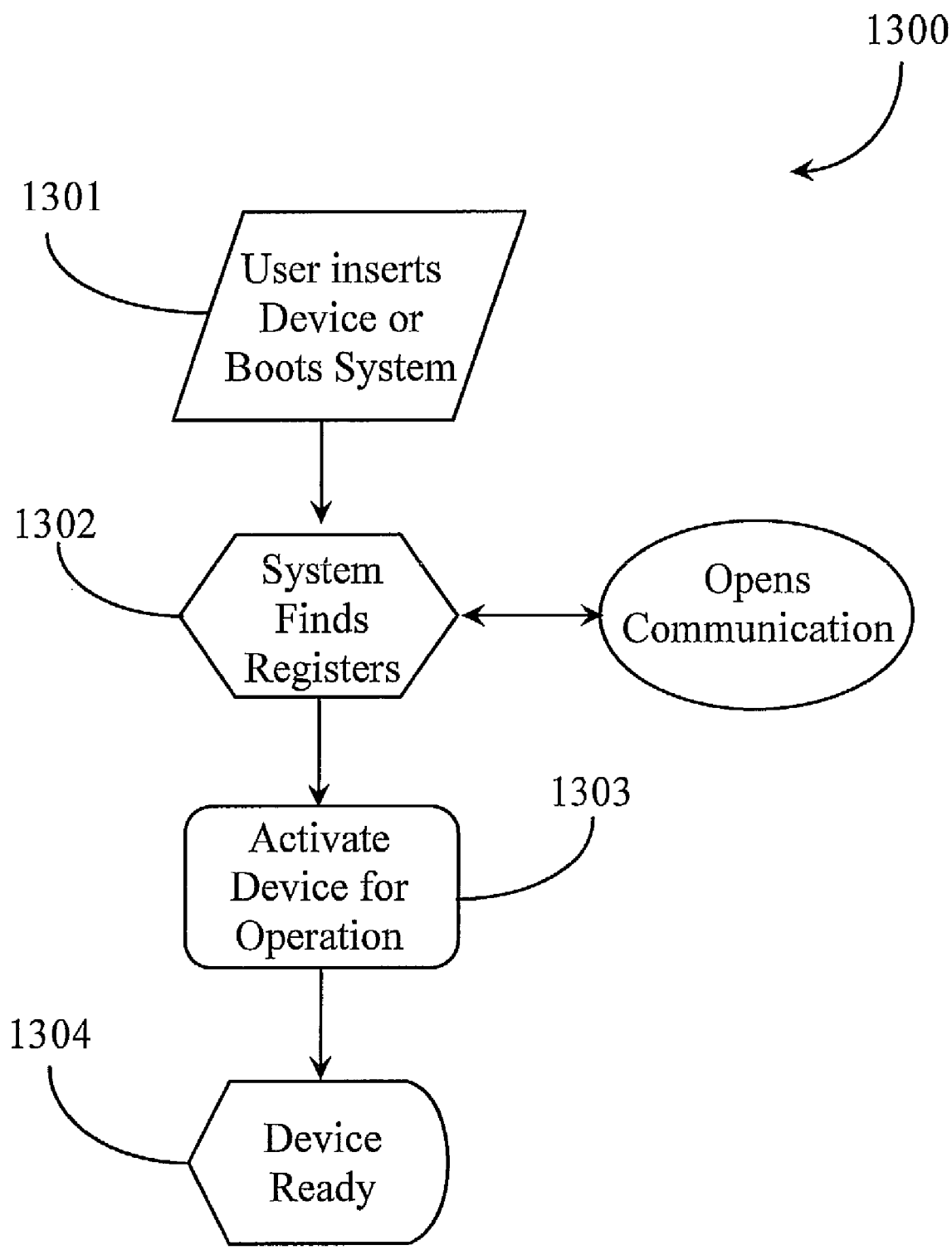
FIG. 13 is a process flow chart illustrating acts for recognizing and activating the device according to embodiments of the present invention.

FIG. 13 is a flow chart illustrating acts 1300 for recognizing and activating the storage device of the present invention according to an embodiment of the present invention. In act 1301, the NVMEM storage element, which may be a flash memory storage element, is connected to the host system through an appropriate interface such as in a PCI slot for example. In one aspect of the invention, the PCI storage element may already be connected to the system, in which case the system may be booted instead.

In act 1302, the host system finds the appropriate disk controller register or USB controller register connected to the PCI Bus through the onboard PCI interface. In act 1302, the host system finds the appropriate control registers on the device within the PCI interface and opens communication directly to those registers.

In act 1303, the host system activates the PCI device according to the onboard ATA or other appropriate disk command protocol. In an embodiment where a RAM cache is provided in the onboard controller, the host system provides power to the RAM module. In act 1304, the PCI device is ready for read and write operations.

It will be clear to one with skill in the art that the specific goals of the present invention may be accomplished using all or some of the components described in this specification without departing from the spirit and scope thereof. For example, ATA controller registers may be replaced with serial advanced technology (SATA) or parallel advanced technology attachment (PATA) controller registers. Likewise, SCSI disk controllers may be provided instead of ATA controllers depending on the intended implementation or version of the product described herein and exemplified above.

Other changes and modifications may be made to certain components without departing from the spirit and scope of the invention. For example, instead of series-parallel flash memory modules, series-parallel MRAM modules may be provided in the embodiment wherein a plurality of modules are provided and connected together in series and in parallel communication. Similarly, series-connected MRAM or parallel-connected MRAM may be used instead of flash. Moreover, different versions of PCI may be supported such as newer PCI-X or PCI Express. Still further, other versions of ATA such as parallel ATA or Ultra-ATA may be supported. All of these are simply design considerations for the end product. There are many possible variations that may be employed where no USB or disk controller utilities are required in order to enable host recognition of the device of the present invention. Likewise, no disk channels or bridging is required resulting in faster performance relative to read and write operations.

It will be apparent to one with skill in the art that the removable PCINVMEM controller of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A method for enabling electronic representation of a removable or fixed data storage device comprising flash memory units as an operating system standard disk directly accessible to a main bus of a computing appliance having a peripheral component interface connector and a motherboard, comprising the steps of:
    (a) connecting the flash memory units together both in series and in parallel;
    (b) providing an integrated controller directly on the device, the integrated controller comprising a peripheral component interface (PCI) ported to a series-parallel PCIFLASH memory controller on the device, the memory controller enabled to control host access to the flash memory units either in series, in parallel, or both;
    (c) providing disk control registers and or bus control registers including appropriate disk and or bus protocols and commands in the peripheral component interface on the device; and
    (d) connecting the device carrying the integrated controller, including the PCI, to the peripheral component interface connector of the computing appliance wherein the computing appliance immediately recognizes the device as a disk without input from a disk controller, disk controller interface, disk channel, USB controller/channel interface and actual hard disk channel interface.

2. The method of claim 1 wherein in step (b), the peripheral component interface and the memory controller are packaged as a system interface controller installable to a card supporting the flash memory units.

3. The method of claim 1 wherein in step (c), the disk controller registers are provided in the form of advanced technology attachment controller registers.

4. The method of claim 1 wherein in step (c), the bus controller registers are provided in the form of universal serial bus controller registers.

5. The method of claim 1 wherein in step (d), the peripheral component interface connector is presented in a standard peripheral component interface slot on the computing appliance.

6. The method of claim 1 wherein in step (d), the peripheral component interface connector is presented on the motherboard of the computing appliance, the device fixedly wired to the motherboard.

7. A method for accelerating reading and writing of data from a removable or fixed data storage device comprising flash memory units connected together both in series and in parallel communication and a system interface controller, the system interface controller including a series-parallel flash memory controller and a peripheral component interface (PCI) with disk and or bus controller registers, including the acts of:
    (a) providing a random access memory controller to the system interface controller, which includes a PCI, and porting it to the flash memory controller;
    (b) providing a random access memory chip to the system interface controller and connecting the chip to the random access memory controller;
    (c) providing flash memory address translation tables in the random access memory; and
    (d) using the random access memory as a data cache for read and write operations performed by a computing appliance wherein, upon connection between the device and the computing appliance, the computing appliance immediately recognizes the device as a disk without input from a disk controller, disk controller interface, disk channel, USB controller/channel interface and actual hard disk channel interface.

8. The method of claim 7, wherein the disk controller registers are provided in the form of advanced technology attachment controller registers.

9. The method of claim 7, wherein the bus controller register are provided in the form of universal serial bus controller registers.

* * * * *

UNITED STATES PATENT AND TRADEMARK OFFICE
CERTIFICATE OF CORRECTION

| | | |
|---|---|---|
| PATENT NO. | : 8,225,022 B2 | Page 1 of 1 |
| APPLICATION NO. | : 11/835395 | |
| DATED | : July 17, 2012 | |
| INVENTOR(S) | : Caulkins | |

It is certified that error appears in the above-identified patent and that said Letters Patent is hereby corrected as shown below:

On the Title Page, in Item (57), under "ABSTRACT", in Column 2, Line 10, delete "and or" and insert -- and/or --, therefor.

On the Title Page, in Item (57), under "ABSTRACT", in Column 2, Line 11, delete "and or" and insert -- and/or --, therefor.

In Column 2, Line 67, delete "and or" and insert -- and/or --, therefor.

In Column 3, Line 1, delete "and or" and insert -- and/or --, therefor.

In Column 3, Line 34, delete "and or" and insert -- and/or --, therefor.

In Column 8, Line 49, delete "technology" and insert -- technology attachment --, therefor.

In Column 9, Line 31, in Claim 1, delete "and or" and insert -- and/or --, therefor.

In Column 9, Line 32, in Claim 1, delete "and or" and insert -- and/or --, therefor.

In Column 10, Line 21, in Claim 7, delete "and or" and insert -- and/or --, therefor.

In Column 10, Lines 42-43, in Claim 9, delete "register" and insert -- registers --, therefor.

Signed and Sealed this
Twenty-sixth Day of February, 2013

Teresa Stanek Rea
*Acting Director of the United States Patent and Trademark Office*